(12) United States Patent
Heath et al.

(10) Patent No.: US 8,804,389 B2
(45) Date of Patent: Aug. 12, 2014

(54) ACTIVE BRIDGE RECTIFICATION

(75) Inventors: Jeffrey Lynn Heath, Santa Barbara, CA (US); Kirk Su, Santa Barbara, CA (US); John Stineman, Carpinteria, CA (US)

(73) Assignee: Linear Technology Corporation, Milpitas, CA (US)

( * ) Notice: Subject to any disclaimer, the term of this patent is extended or adjusted under 35 U.S.C. 154(b) by 217 days.

(21) Appl. No.: 13/398,046

(22) Filed: Feb. 16, 2012

(65) Prior Publication Data

US 2013/0215657 A1 Aug. 22, 2013

(51) Int. Cl.
*H02M 5/42* (2006.01)
*H02M 7/217* (2006.01)

(52) U.S. Cl.
USPC ............................................ 363/89; 363/127

(58) Field of Classification Search
CPC ................................. H02M 1/38; H02M 7/219
USPC ............... 363/127, 124, 84, 89, 125; 327/104
See application file for complete search history.

(56) References Cited

U.S. PATENT DOCUMENTS

| 6,324,084 | B1 * | 11/2001 | Fujisawa ....................... 363/127 |
| 6,563,726 | B1 | 5/2003 | Hirst |
| 7,738,272 | B2 * | 6/2010 | Klapf et al. ..................... 363/67 |
| 8,526,201 | B2 * | 9/2013 | Minami et al. .................. 363/17 |
| 2006/0072774 | A1 | 4/2006 | Fluit |
| 2009/0257259 | A1 | 10/2009 | Leibovitz |
| 2010/0165686 | A1 | 7/2010 | Matzberger et al. |

FOREIGN PATENT DOCUMENTS

| JP | 2010-074950 | * | 2/2010 | ..................... 363/127 |
| WO | WO 2010/022748 | | 3/2010 | |

OTHER PUBLICATIONS

Davide Giacomini, A Novel Efficient Approach to Input Bridges, May 2008, IEEE.*

* cited by examiner

*Primary Examiner* — Matthew Nguyen
(74) *Attorney, Agent, or Firm* — McDermott Will & Emery LLP

(57) ABSTRACT

Technique for controlling a circuit that converts an AC input voltage into a DC output voltage using transistors arranged in first and second transistor pairs. Each transistor of the first pair is controlled in accordance with polarity of the AC input voltage. Each transistor of the second pair is controlled based on a difference between the AC input voltage and the DC output voltage.

25 Claims, 8 Drawing Sheets

ACTIVE BRIDGE RECTIFICATION

TECHNICAL FIELD

This disclosure relates to power supply systems, and more particularly, to an active bridge rectifier circuit including two pairs of transistors controlled based on different criteria.

BACKGROUND ART

An AC electrical power delivery system is the predominant energy delivery system between the locations where power is generated and where it is consumed. On the other hand, most electronic systems require DC power. The most common method for converting AC power into DC power is rectification using diode half-wave bridge rectification schemes or diode full-wave bridge rectification schemes.

In any of the diode bridge rectification schemes used to convert an AC voltage to a DC voltage, power is lost and waste heat is generated because of the inherent voltage drop in the diodes. MOSFET transistors coupled to appropriate control circuits are an attractive alternative to diodes in full bridge rectifier systems to reduce wasted energy. However, such factors as system noise make it very difficult to control switching of transistors in a rectifier circuit so as to achieve efficient rectification. Mistakenly turning on transistors that should not be turned on can cause catastrophic failure of the transistors, controller, and input AC power supply, as well as the circuits supplied with the output DC power. As a result, there are no commercially available MOSFET bridge controllers on the market.

There is a need for a new technique to provide active control of transistors in a rectifier circuit for converting an AC input voltage into a DC output voltage.

SUMMARY OF THE DISCLOSURE

In accordance with one aspect, the present disclosure suggests a method of controlling a circuit for converting an AC input voltage into a DC output voltage that has first and second transistors arranged in a first transistor pair, and third and fourth transistors arranged in a second transistor pair. The method involves controlling a transistor of the first pair in accordance with polarity of the AC input voltage, and controlling a transistor of the second pair based on a difference between the AC input voltage and the DC output voltage.

In particular, a transistor of the second pair may be turned on when the difference between the AC input voltage and the DC output voltage exceeds a turn on threshold value, and may be turned off when the difference between the AC input voltage and the DC output voltage falls below a turn off threshold value, which is lower than the turn on threshold value.

In accordance with another aspect of the disclosure, a system for converting an AC input voltage into a DC output voltage, comprises first and second transistors arranged in a first transistor pair, third and fourth transistors arranged in a second transistor pair, and a controller responsive to the input voltage and the output voltage to control switching of the first, second, third and fourth transistors. The controller includes an AC polarity detect circuit for determining polarity of the AC input voltage to produce a first enabling signal that enables the first transistor to turn on.

Also, the AC polarity detect circuit may determine polarity of the AC input voltage to produce a second enabling signal that enables the second transistor to turn on. The AC polarity detect circuit is configured to prevent the second transistor from turning on when the first transistor is on.

The controller may further comprise a transistor control circuit responsive to the first enabling signal to enable control of the third transistor, and responsive to the second enabling signal to enable control of the fourth transistor.

The transistor control circuit may sense the AC input voltage and the DC output voltage to determine a voltage across the third transistor and a voltage across the fourth transistors based on a difference between the AC input voltage and the DC output voltage.

In particular, the transistor control circuit may adjust a control voltage applied to the third transistor when the difference between the AC input voltage and the DC output voltage exceeds a regulate threshold value.

Further, the transistor control circuit may turn on the third transistor when the difference between the AC input voltage and the DC output voltage exceeds a turn on threshold value, which may be higher than the regulate threshold value.

The transistor control circuit may turn off the third transistor when the difference between the AC input voltage and the DC output voltage falls below a turn off threshold value, which may be lower than the regulate threshold value.

Also, the transistor control circuit may produce a lock out signal for preventing the fourth transistor from turning on when the third transistor is on. The lock out signal may be produced when the difference between the AC input voltage and the DC output voltage exceeds a lock out threshold value, which may be lower than the regulate threshold value.

In an exemplary embodiment, the first to fourth transistors may be MOSFETs, preferably, N-channel MOSFETs.

In accordance with a further aspect of the disclosure, a system for converting an AC input voltage into a DC output voltage comprises first and second transistors arranged in a first transistor pair, third and fourth transistors arranged in a second transistor pair, and a controller responsive to the AC input voltage and the DC output voltage to control switching of the first, second, third and fourth transistors. The controller may include a transistor control circuit for turning on the third transistor based on a difference between the AC input voltage and the DC output voltage. The transistor control circuit is configured for producing a first lock out signal asserted to prevent the fourth transistor from turning on when the third transistor is on.

Also, the transistor control circuit may produce a second lock out signal asserted to prevent the third transistor from turning on when the fourth transistor is on.

The transistor control circuit may turn on the third transistor when a difference between the AC input voltage and the DC output voltage exceeds a turn on threshold value, and may produce the first lock out signal when the difference between the AC input voltage and the DC output voltage exceeds a lock out threshold value which is lower than the turn on threshold value.

The controller may further comprise an AC polarity detect circuit for producing first and second enabling signals based on the polarity of the AC input signal, the first and second enabling signals are generated to respectively turn on the first and second transistors.

The AC polarity detect circuit may be configured to produce the first enabling signal so as to prevent the second transistor from turning on when the first transistor is on, and to produce the second enabling signal so as to prevent the first transistor from turning on when the second transistor is on.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples presented below. It will become apparent, however, that the concept of the disclosure is applicable to any rectifier circuit having elements actively controlled for converting an AC signal to a DC signal.

Figure 1:
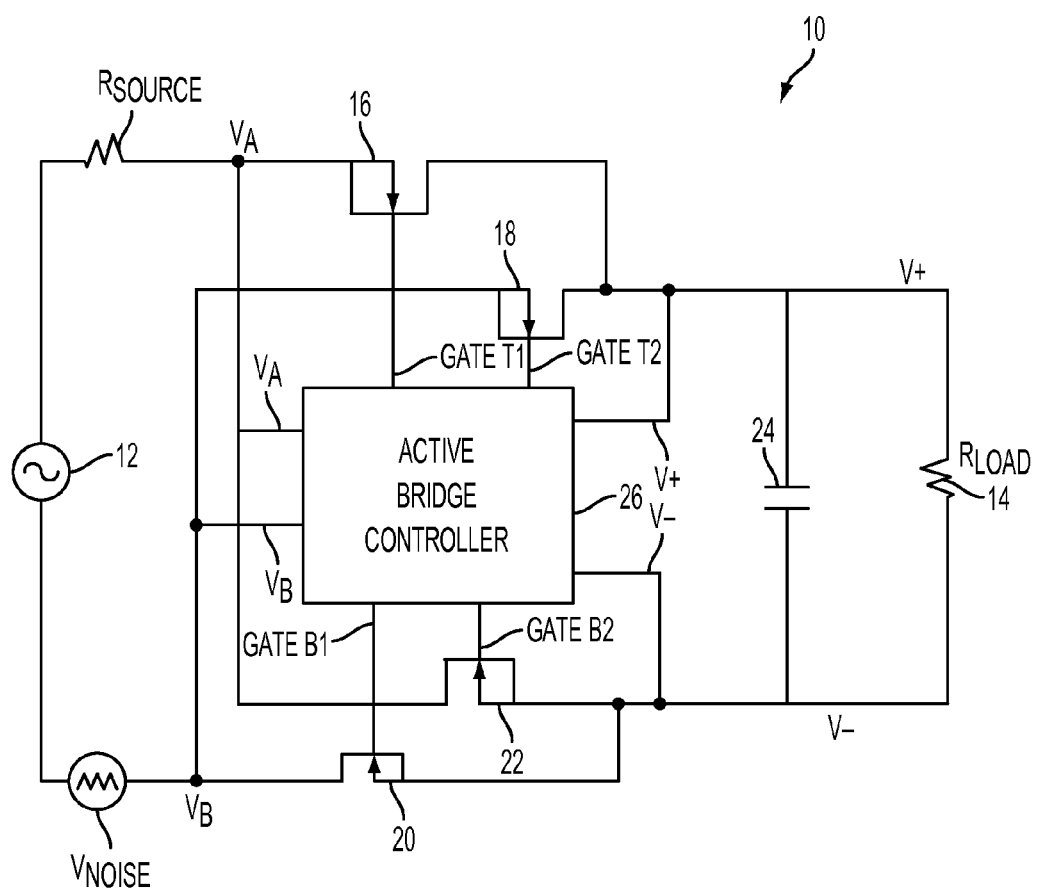
FIG. 1 shows an exemplary embodiment of a system for converting an AC voltage into a DC voltage in accordance with the present disclosure.

FIG. 1 shows an exemplary active bridge rectifier circuit 10 of a present disclosure. The active bridge rectifier circuit 10 converts an AC input voltage from an AC power source 12 to produce DC output voltages V+ and V− delivered to a load 14 represented in FIG. 1 by resistance $R_{LOAD}$. The resistance of the power source 12 is represented in FIG. 1 by resistance $R_{SOURCE}$. System noise is represented in FIG. 1 by noise voltage $V_{NOISE}$ shown at the output of the AC power source 12.

The active bridge rectifier circuit 10 includes an active bridge composed of "top-side" MOSFETs 16 and 18, and "bottom-side" MOSFETs 20 and 22. In an example described in the present disclosure, the MOSFETs 16, 18, 20 and 22 are N-type MOSFETs. However, P-type MOSFETs, NPN BJT transistors, and PNP transistors also can be used. An output capacitor 24 is coupled in parallel to $R_{LOAD}$.

An active bridge controller 26 is connected to gates of the MOSFETs 16, 18, 20 and 22 to turn them on and off so as to achieve efficient rectification. As disclosed in more detail below, input AC voltages $V_A$ and $V_B$ developed across the AC source 12 are applied to inputs of the active bridge controller 26. Also, output DC voltages V+ and V− produced by the rectifier circuit 10 are supplied to inputs of the active bridge controller 26. Top-side gate control signals GATE T1 and GATE T2 are produced by the controller 26 to control the gates of the top-side MOSFETs 16 and 18, respectively. Bottom-side gate control signals GATE B1 and GATE B2 are produced by the controller 26 to control the gates of the bottom-side MOSFETs 20 and 22, respectively.

Switching of the top-side MOSFETs 16, 18 may be controlled in accordance with conditions different from conditions determined to control switching of the bottom-side MOSFETs 20, 22. Also, a linear regulation scheme may be implemented to control the transition between the two top-side MOSFETs 16 and 18. Additionally, a lockout procedure may be carried out to ensure that opposing MOSFETs are never on at the same time, providing efficiency and ruggedness benefits.

Figure 2:
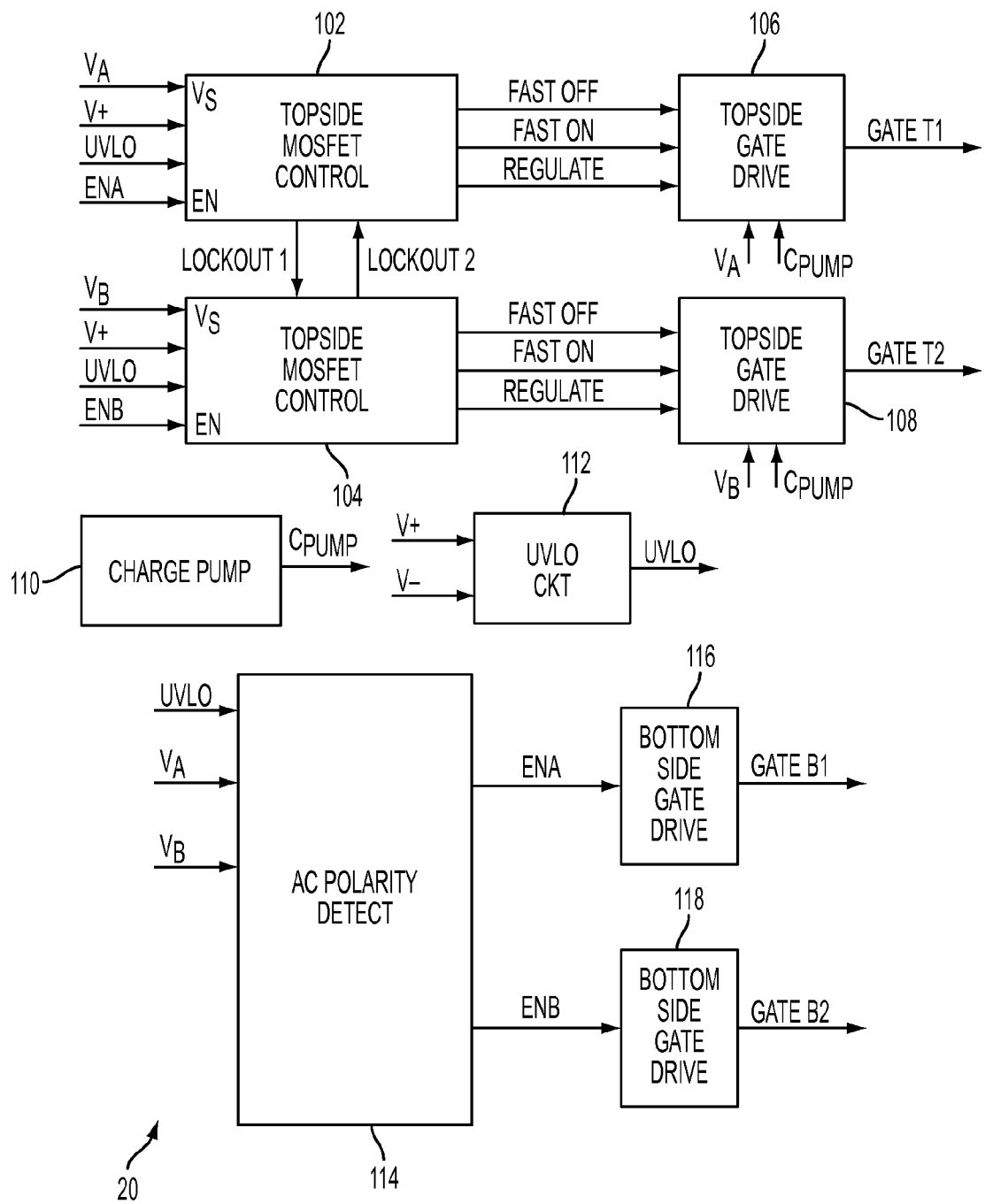
FIG. 2 shows an exemplary embodiment of the active bridge controller in FIG. 1.

As shown in FIG. 2, an exemplary arrangement of the active bridge controller 26 includes a pair of top-side MOSFET control circuits 102 and 104, and a pair of top-side drive circuits 106 and 108. The top-side MOSFET control circuit 102 monitors the voltages $V_A$ and V+, an Under Voltage Lock Out (UVLO) signal, and a top-side enabling signal ENA. The top-side MOSFET control circuit 104 monitors the voltages $V_B$ and V+, the UVLO signal, and a bottom-side enabling signal ENB. Also, the control circuit 104 monitors LOCK OUT 1 signal produced by the control circuit 102, whereas the control circuit 102 monitors LOCK OUT 2 signal produced by the control circuit 104. As discussed in more detail later, the LOCK OUT 1 and LOCK OUT 2 signals are asserted to ensure that both top-side MOSFETs 16 and 18 are never on at the same time.

Each of the control circuits 102 and 104 produces respective control signals FAST OFF, FAST ON and REGULATE for controlling each of the top-side gate drive circuits 106 and 108, respectively. The top-side gate drive circuit 106 is controlled to produce the gate control signal GATE T1 supplied to the gate of the MOSFET 16, and the top-side gate drive circuit 108 is controlled to produce the gate control signal GATE T2 supplied to the gate of the MOSFET 16. To provide high voltage gate control signals for controlling N-type MOSFETs, the gate drive circuits 106 and 108 are supplied with charge pump voltage CPUMP produced by a charge pump 110. Also, the gate drive circuits 106 and 108 are provided with the voltages $V_A$ and $V_B$ respectively.

Further, the controller 26 includes a UVLO circuit 112 that asserts the UVLO signal based on the DC output voltages V+ and V−. In particular, the UVLO signal is asserted when a difference between the voltages V+ and V− is greater than a predetermined reference voltage $V_{REF}$. The UVLO signal ensures that any one of the MOSFETs 16, 18, 20 and 22 is not allowed to be turned on until there is enough voltage available for each of the other MOSFETs to operate properly.

Also, the controller 26 includes an AC polarity detect circuit 114 that produces the enabling signals ENA and ENB based on the input AC voltages $V_A$ and $V_B$, and the UVLO signal. The controller 26 further includes bottom-side gate drive circuits 116 and 118 respectively responsive to the ENA and ENB signals for producing gate control signals GATE B1 and GATE B2 supplied to the gates of the bottom-side MOSFETs 20 and 22. The bottom-side gate drive circuits 116 and 118 may include buffer circuits for forming the GATE B1 and GATE B2 signals based on the respective ENA and ENB signals so as to turn on the appropriate bottom-side MOSFET at a predetermined value of the AC input voltage and at a predetermined polarity, and to prevent both bottom-side MOSFETs 20 and 22 from turning on at the same time due to the system noise or other reasons.

Also, the enabling signals ENA and ENB are respectively supplied to the top-side MOSFET control circuits 102 and 104 to enable the MOSFET control circuits to control the respective MOSFET in a pair of top-side MOSFETs 16, 18 so as to prevent one MOSFET in the pair from turning on when the other MOSFET in the pair is turned on.

Figure 3:
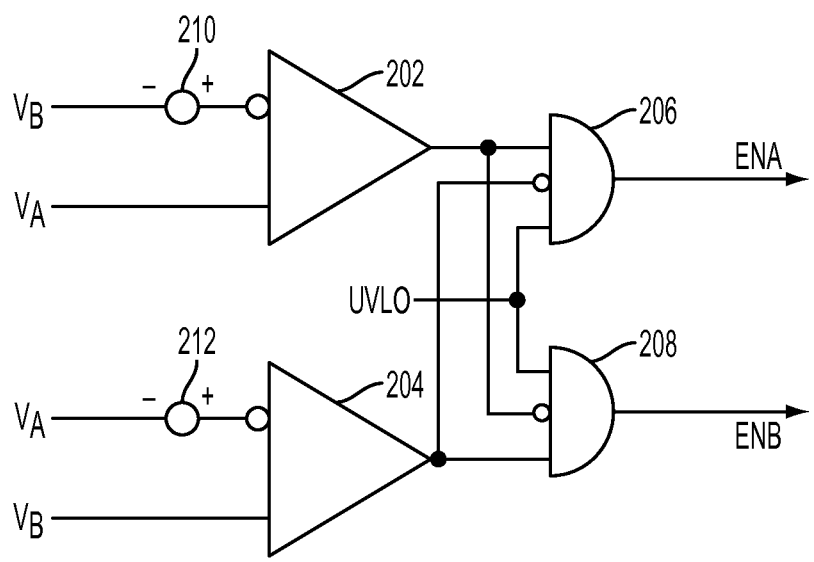
FIG. 3 shows an exemplary embodiment of the AC polarity detect circuit in FIG. 2.

As shown in FIG. 3, an exemplary AC polarity detect circuit 114 includes comparators 202 and 204, and AND gates 206 and 208. The comparator 202 compares a difference between $V_A$ and $V_B$ with an AC polarity detect threshold defined by a threshold setting element 210. The comparator 204 compares a difference between $V_B$ and $V_A$ with an AC polarity detect threshold defined by a threshold setting element 212. The AC polarity detect thresholds defined by elements 210 and 212 may be set at the same level. The inverting input of the comparator 202 receives the voltage $V_B$ increased by the AC polarity detect threshold value and the inverting input of the comparator 204 receives the voltage $V_A$ increased by the AC polarity detect threshold value. The non-inverting inputs of the comparators 202 and 204 are supplied with the voltages $V_A$ and $V_B$, respectively. The AC polarity detect circuit 114 also includes AND gates 206 and 208, each of which has a pair of non-inverting inputs and one inverting input. The output of the comparator 202 is supplied to the non-inverting input of the AND gate 206 and to the inverting input of the AND gate 208. The output of the comparator 204 is supplied to the non-inverting input of the AND gate 208 and to the inverting input of the AND gate 206. The UVLO signal is supplied to the remaining non-inverting inputs of the AND gates 206 and 208. The outputs of the AND gates 206 and 208 produce the enabling signals ENA and ENB, respectively.

Figure 4A:
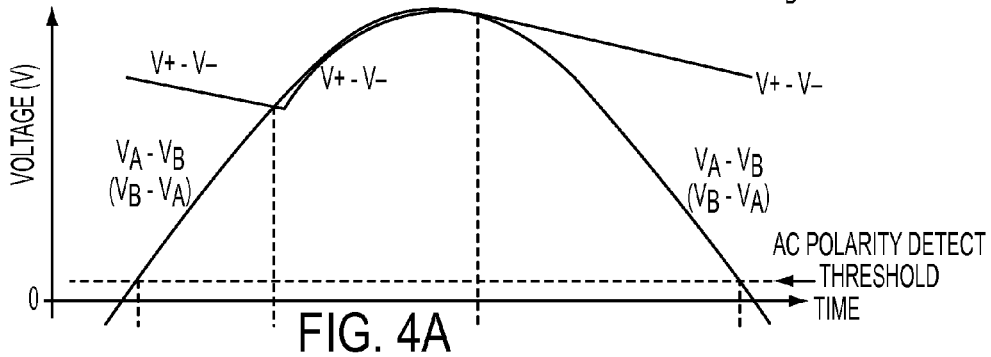
FIGS. 4A-4G are timing diagrams illustrating control operations based on the AC polarity detection in accordance with the present disclosure.

Timing diagrams in FIGS. 4A-4G illustrate operation of the AC polarity detect circuit 114. It is noted that the diagrams illustrate signals produced when $V_A$ is greater than $V_B$, and when $V_B$ is greater than $V_A$. The signals corresponding to the case when $V_B$ is greater than $V_A$ are shown in FIGS. 4A-4 in parentheses.

Figure 4B:
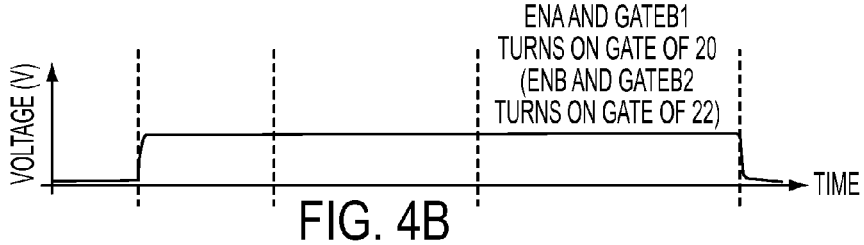

In particular, as shown in FIG. 4A, the AC polarity detect circuit compares values of $(V_A-V_B)$ and $(V_B-V_A)$ with the AC polarity detect threshold. As shown in FIG. 4B, when $(V_A-V_B)$ rises to the threshold level, the ENA signal is asserted to produce the GATE B1 signal that turns on the bottom-side MOSFET 20. The ENA signal remains asserted until $(V_A-V_B)$ falls below the level of the AC polarity detect threshold.

When $(V_B-V_A)$ rises to the threshold level, the ENB signal is asserted to produce the GATE B2 signal that turns on the bottom-side MOSFET 22. The ENB signal remains asserted until $(V_B-V_A)$ falls below the level of the AC polarity detect threshold.

Figure 4C:
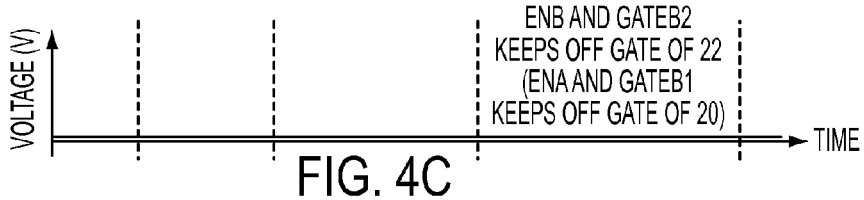

As illustrated in FIG. 4C, when the ENA and GATE B1 signals are not asserted, the gate of the MOSFET 20 is controlled to keep the MOSFET 20 in an off-state. Similarly, when the ENB and GATE B2 signals are not asserted, the gate of the MOSFET 22 is controlled to keep the MOSFET 22 in an off state.

Figure 4D:
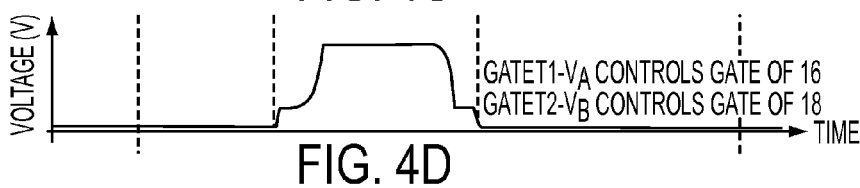

FIG. 4D illustrates voltage (GATE T1–$V_A$) corresponding to a difference between the voltage GATE T1 and the voltage $V_A$, and voltage (GATE T2–$V_B$) corresponding to a difference between the voltage GATE T2 and the voltage $V_B$. The voltage (GATE T1–$V_A$) developed across the MOSFET 16 and the voltage (GATE T2–$V_B$) developed across the MOSFET 18 respectively control gates of the MOSFETs 16 and 18 to turn the respective MOSFET on and off in accordance with MOSFET control procedures discussed later.

Figure 4E:

As illustrated in FIG. 4E, when the GATE T1 signal is not asserted, the gate of the MOSFET 16 is controlled by the voltage value (GATE T1–$V_A$) to keep the MOSFET 16 in an off-state. When the GATE T2 signal is not asserted, the gate of the MOSFET 18 is controlled by the voltage value (GATE T2–$V_B$) to keep the MOSFET 18 in an off-state.

Figure 4F:
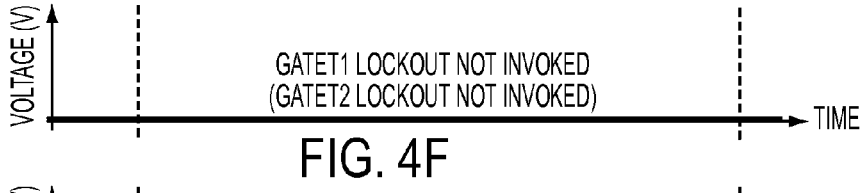
Figure 4G:
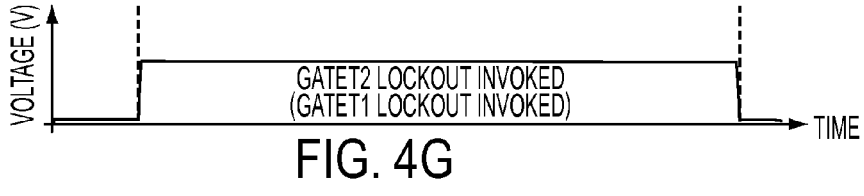

As illustrated in FIGS. 4F-4G, when the value $(V_A-V_B)$ reaches the level of the AC polarity detect threshold, the LOCK OUT 1 signal is asserted by the top-side MOSFET control circuit 102 to prevent the top-side MOSFET 18 from turning on, when the MOSFET 16 is on. The LOCK OUT 1 signal remains asserted until the value $(V_A-V_B)$ falls below the level of the AC polarity detect threshold.

Similarly, when the value $(V_B-V_A)$ reaches the level of the AC polarity detect threshold, the LOCK OUT 2 signal is produced by the top-side MOSFET control circuit 104 to prevent the top-side MOSFET 16 from turning on, when the MOSFET 18 is on. The LOCK OUT 2 signal is asserted until the value $(V_B-V_A)$ exceeds the level of the AC polarity detect threshold.

Figure 5:
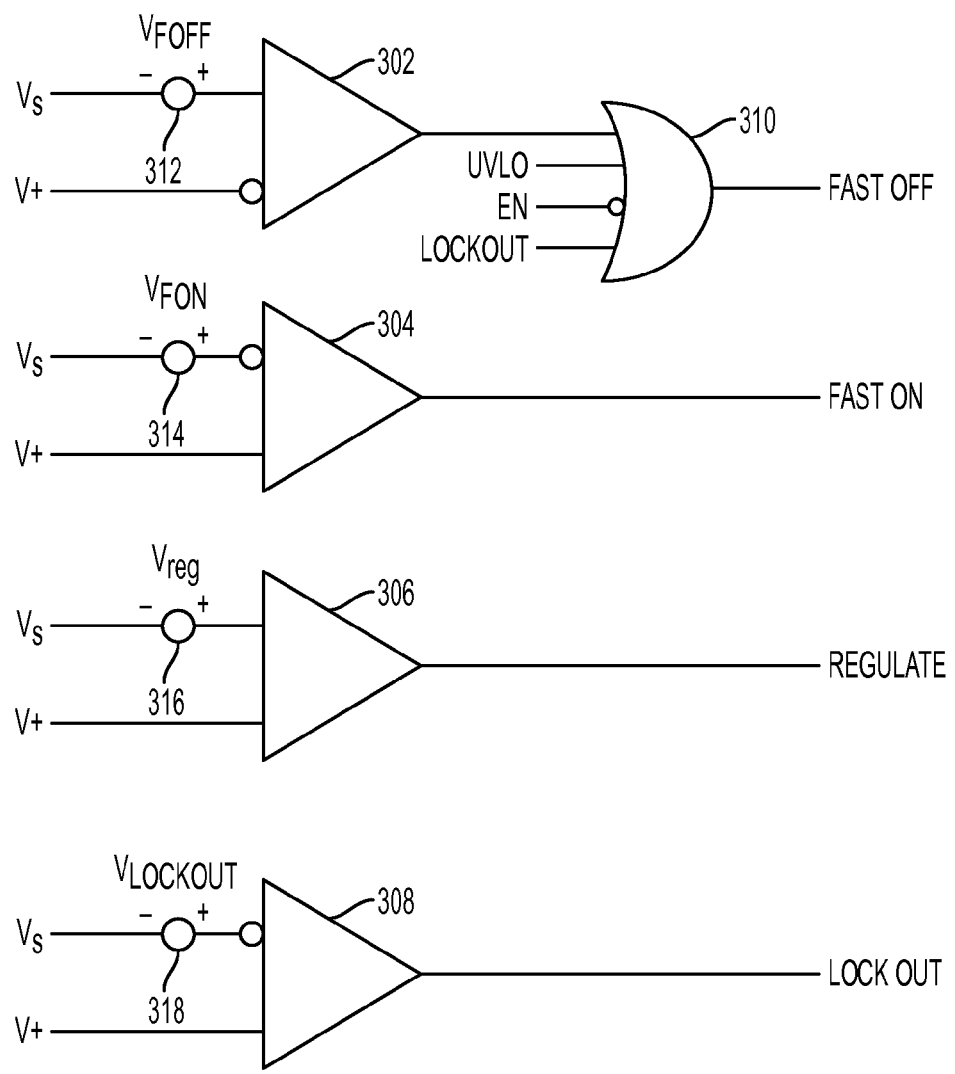
FIG. 5 shows an exemplary embodiment of each top-side MOSFET control circuit in FIG. 2.

As shown in FIG. 5, an exemplary arrangement of each top-side MOSFET control circuit 102 or 104 may include comparators 302, 304 and 308, an operational amplifier 306 and an OR gate 310. Each of the comparators 302, 304, and 308 and the operational amplifier 306 compares a difference (Vs–V+) between voltages Vs and V+, with a threshold voltage set to control the top-side gate drive 106 and 108, where the voltage Vs corresponds to the voltage $V_A$ for the top-side MOSFET control circuit 102, and corresponds to the voltage $V_B$ for the top-side MOSFET control circuit 104.

In particular, the comparator 302 compares the (Vs–V+) value with a threshold voltage $V_{FOFF}$ set by a threshold setting element 312 to produce a signal supplied to non-inverting input of the OR gate 310 when the (Vs–V+) value is below the threshold voltage $V_{FOFF}$. The inverting input of the comparator 302 is receives the voltage V+, whereas the non-inverting input receives the Vs voltage increased by the $V_{FOFF}$ value.

The UVLO and LOCK OUT signals are supplied to other non-inverting inputs of the OR gate 310, and the EN signal is supplied to the inverting input of the OR gate 310, where the LOCK OUT and EN signals correspond to the LOCK OUT 2 and ENA signals for the top-side MOSFET control circuit 102, and correspond to the LOCK OUT 1 and ENB signals for the top-side MOSFET control circuit 104. The FAST OFF signal is asserted at the output of the OR gate 310.

The comparator 304 compares (Vs–V+) with a threshold voltage $V_{FON}$ set by a threshold setting element 314 to produce the FAST ON signal when the (Vs–V+) value exceeds the threshold voltage $V_{FON}$. The non-inverting input of the comparator 304 is responsive to the voltage V+, whereas the inverting input receives the Vs voltage increased by the $V_{FON}$ value.

The operational amplifier 306 compares (Vs–V+) with a threshold voltage $V_{REG}$ set by a threshold setting element 316 to produce the REGULATE signal when the (Vs–V+) value exceeds the threshold voltage $V_{REG}$. One input of the operational amplifier 306 is responsive to the voltage V+, whereas the other input receives the Vs voltage increased by the $V_{REG}$ value.

The comparator 308 compares (Vs–V+) with a threshold voltage $V_{LOCKOUT}$ set by a threshold setting element 318 to produce the LOCK OUT 1 or LOCK OUT 2 signal when the (Vs–V+) value exceeds the threshold voltage $V_{LOCKOUT}$. The non-inverting input of the comparator 302 is responsive to the voltage V+, whereas the inverting input receives the Vs voltage increased by the $V_{LOCKOUT}$ value.

The FAST OFF signal is asserted if there is a UVLO condition, the respective topside MOSFET control circuit is not enabled, the other top-side MOSFET control circuit is asserting the LOCKOUT signal, or the voltage (Vs–V+) is below a predetermined threshold voltage $V_{FOFF}$. If the respective top-side gate drive circuit 108 or 108 receives this signal, it will rapidly turn off the respective topside MOSFET 16 or 18.

The FAST ON signal is asserted if the voltage (Vs−V+) exceeds a predetermined threshold voltage $V_{FON}$ to control the respective top-side gate drive circuit 106 and 108 to rapidly turn on the respective topside MOSFET 16 or 18. The REGULATE signal is an analog signal that adjusts the gate voltage of the respective topside MOSFET 16 or 18 so that the drain-source voltage across the MOSFET 16 or 18 is maintained at a pre-determined voltage level $V_{REG}$, which is set low enough to maintain the power loss across the respective MOSFET 16 or 18 at a minimal level, but high enough to reliably detect when the drain-source voltage Vds of the respective MOSFET 16 or 18 is less than zero.

The LOCKOUT 1 or LOCKOUT 2 signal is asserted at a predetermined level of the respective MOSFET drain-source voltage Vds selected using the $V_{LOCKOUT}$ threshold value. The LOCKOUT 1 or LOCKOUT 2 signal is sent from one top-side MOSFET control circuit to the other top-side MOSFET control circuit to ensure that both topside MOSFETs 16 and 18 are never on at the same time.

Figure 6A:
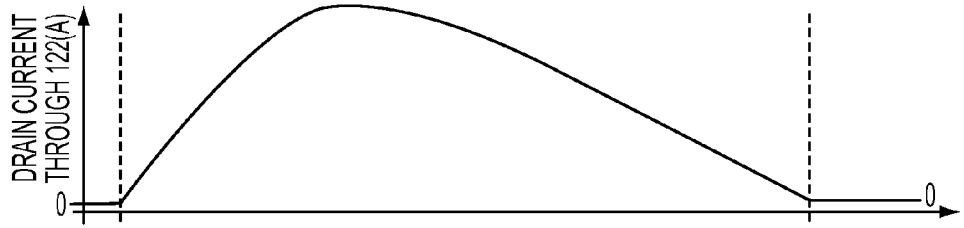
FIGS. 6A-6E are timing diagrams illustrating control of each top-side MOSFET in FIG. 1.
Figure 6B:
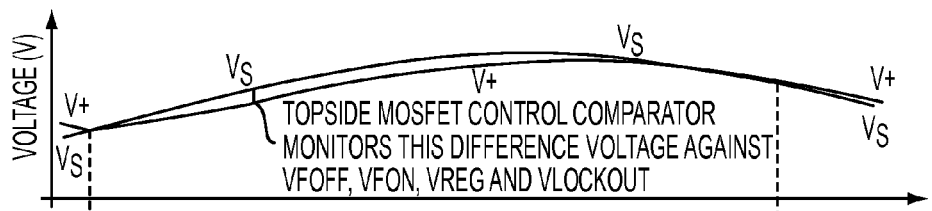
Figure 6C:
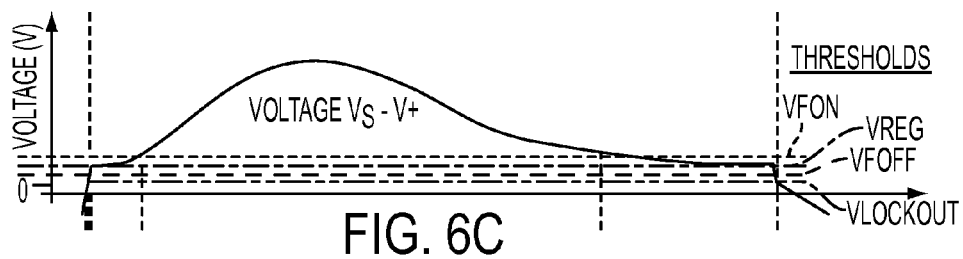
Figure 6D:
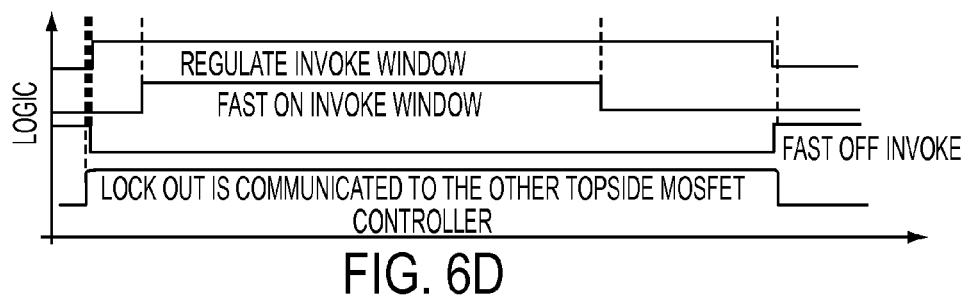

Timing diagrams in FIGS. 6A-6E illustrate operations of the top-side MOSFET control circuit 102 that controls the MOSFET 16. The top-side MOSFET control circuit 104 operates in a similar manner. In particular, FIG. 6A illustrates drain current flowing through the MOSFET 16. FIG. 6B shows voltages Vs and V+. FIG. 6C illustrates correspondence between the voltage value (Vs−V+) and the threshold voltages $V_{FON}$, $V_{FOFF}$, $V_{REG}$ and $V_{LOCKOUT}$. FIG. 6D shows logic values corresponding to the signals REGULATE, FAST ON, FAST OFF and LOCK OUT asserted by the top-side MOSFET control circuit 102 in response to a change in the voltage (Vs−V+).

In particular, as shown in FIG. 6D, the REGULATE signal is proportional to the voltage (Vs−V+) attempting to maintain the $V_{REG}$ level. The FAST ON signal is asserted when the voltage (Vs−V+) exceeds the $V_{FON}$ level and deasserted when the voltage (Vs−V+) is below the $V_{FON}$ level. The FAST OFF signal may be asserted when the voltage (Vs−V+) is below the $V_{FOFF}$ level. The LOCK OUT signal is asserted when the voltage (Vs−V+) exceeds the $V_{LOCKOUT}$ level and deasserted when the voltage (Vs−V+) falls below the $V_{LOCKOUT}$ level, where the LOCK OUT signal corresponds to the LOCK OUT 1 signal produced by the MOSFET control circuit 102 or to the LOCK OUT 2 signal produced by the MOSFET control circuit 104.

Figure 6E:
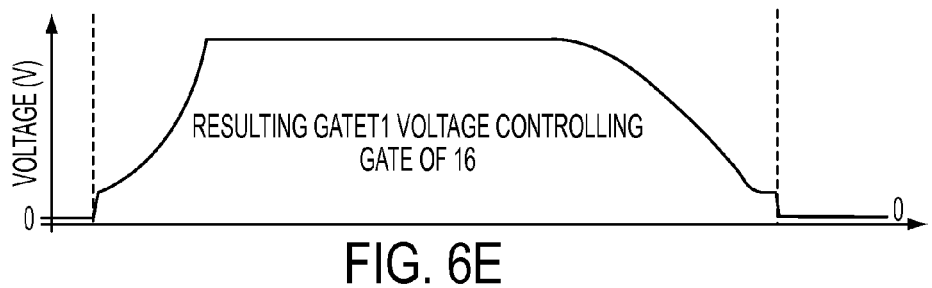

FIG. 6E illustrates the GATE T1 voltage produced by the top-side gate drive 106 based on the signals REGULATE, FAST ON, FAST OFF and LOCK OUT asserted by the respective top-side MOSFET control circuit 102.

The $V_{REG}$ voltage may be lower than the $V_{FON}$ voltage but greater than the $V_{FOFF}$ voltage, which is greater that the $V_{LOCKOUT}$ voltage. The $V_{REG}$ voltage may be chosen to be much less than a voltage drop on the body diode of the respective MOSFET.

The $V_{FOFF}$ voltage may be chosen to be greater than 0 V by an amount sufficient to allow the respective MOSFET to be turned off before the polarity across the MOSFET goes negative i.e. V+ becomes greater than $V_S$. This prevents any reverse current that can cause the waste of energy.

The $V_{FON}$ voltage may chosen to be higher than the $V_{REG}$ voltage by an amount sufficient to allow the operational amplifier 306 that operates in the linear region to control the respective MOSFET in the saturated region so as to prevent the active bridge circuitry from oscillating at the beginning and at the end of the conduction cycle of the MOSFET. The range between $V_{FON}$ and $V_{FOFF}$ is selected to provide a relatively low gain of the operational amplifier 306 to enable the amplifier 306 to operate under normal noise conditions.

The $V_{LOCKOUT}$ voltage may be chosen to be below the $V_{FOFF}$ value so as to ensure that when one top-side MOSFET control circuit 102 or 104 begins to turn on its respective top-side MOSFET, the other top-side MOSFET control circuit can not turn on its respective top-side MOSFET. This lockout can prevent the catastrophic event when both top-side MOSFETs are on at the same time.

Figure 7:
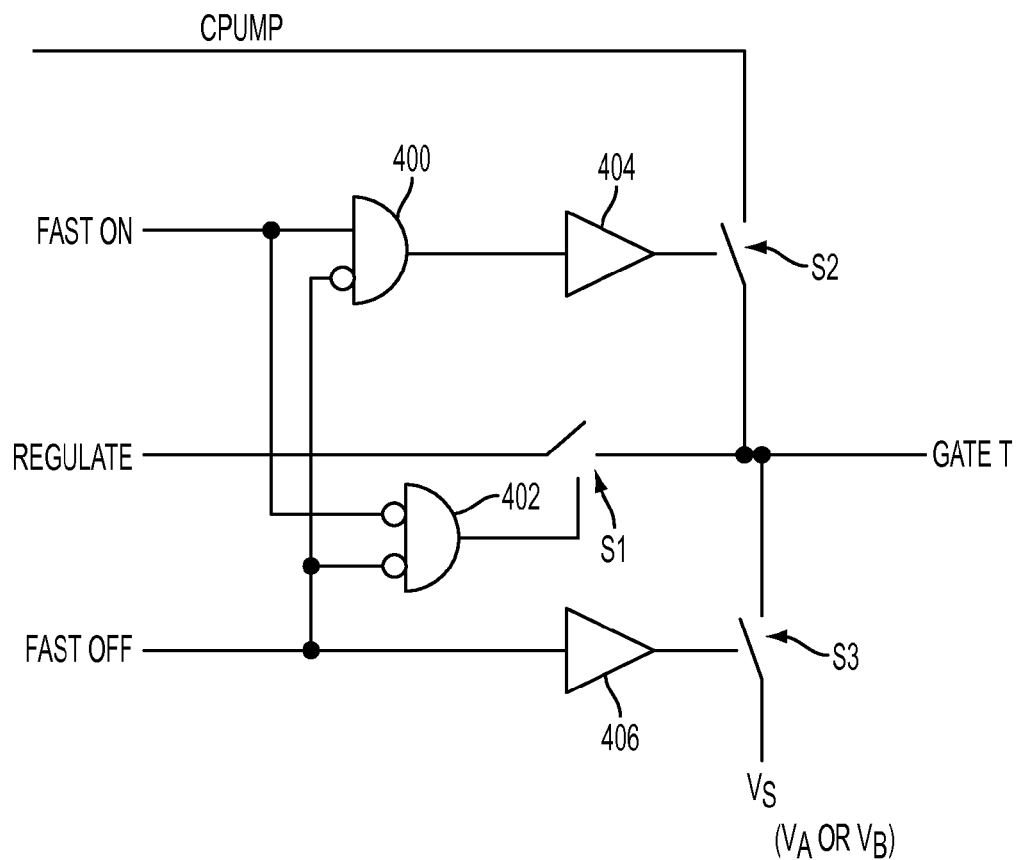
FIG. 7 is an exemplary embodiment of each top-side gate drive circuit in FIG. 2.

As shown in FIG. 7, an exemplary top-side MOSFET control circuit 102 or 104 may include an AND gates 400 and 402, buffers 404 and 406 and switches S1, S2 and S3. The AND gate 400 has a non-inverting input supplied with the FAST ON signal, and inverting input supplied with the FAST OFF signal. The AND gate 402 has inverting inputs responsive to the FAST ON and FAST OFF signals. Only one of the switches S1, S2 or S3 can be on at the same time. The analog signal REGULATE passes to the respective MOSFET gate through the switch S1 when S1 is closed by the output of the AND gate 402 and the switches S2 and S3 are open by signals buffered by the buffers 404 and 406. The switch S2 is controlled by the output of the AND gate 400 via the buffer 404 to apply the CPUMP voltage produced by the charge pump 110 to the MOSFET gate. The CPUMP voltage is applied to operate the gates of the respective MOSFET 16 or 18 above their sources voltages, so as to support operations of N-channel MOSFETS. The switch S3 is controlled by the FAST OFF signal via the buffer 406 to apply the FAST OFF signal to the MOSFET gate.

Figure 8:
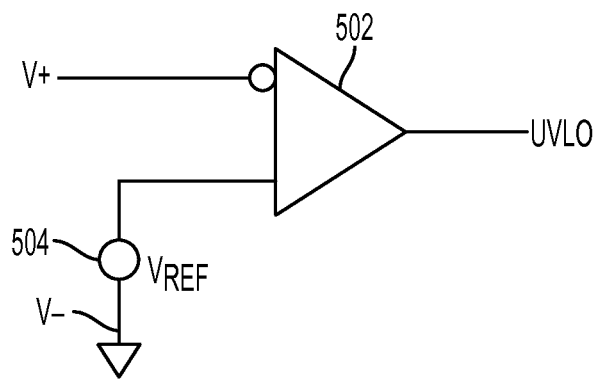
FIG. 8 is an exemplary embodiment of the Under Voltage Lock Out (UVLO) circuit in FIG. 2.

FIG. 8 illustrates an exemplary UVLO circuit 112 that produces the UVLO signal when a difference between the voltages V+ and V− is greater than a predetermined reference voltage $V_{REF}$. In particular, the UVLO circuit 112 may include a comparator 502 having an inverting input supplied by the V+ voltage, and a non-inverting input supplied with the V− value increased by the $V_{REF}$ value set by a reference voltage setting element 504.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A system for converting an AC input voltage into a DC output voltage, comprising:
   first and second transistors arranged in a first transistor pair,
   third and fourth transistors arranged in a second transistor pair, and
   a controller responsive to the input voltage and the output voltage to control switching of the first, second, third and fourth transistors,
   the controller including an AC polarity detect circuit for determining polarity of the AC input voltage to produce a first enabling signal that enables the first transistor to turn on.

2. The system of claim 1, wherein the AC polarity detect circuit is configured for determining polarity of the AC input voltage to further produce a second enabling signal that enables the second transistor to turn on, the controller being configured to prevent the second transistor from turning on when the first transistor is on.

3. The system of claim 2, wherein the controller further comprises a transistor control circuit responsive to the first enabling signal to enable control of the third transistor.

4. The system of claim 3, wherein the transistor control circuit is responsive to the second enabling signal to enable control of the fourth transistor.

5. The system of claim 4, wherein the transistor control circuit is further configured for controlling the third transistor based on a voltage across the third transistor and for controlling the fourth transistor based a voltage across the fourth transistors.

6. The system of claim 5, wherein the transistor control circuit is further configured to adjust a control voltage applied to the third transistor when a difference between the AC input voltage and the DC output voltage exceeds a regulate threshold value.

7. The system of claim 6, wherein the transistor control circuit is further configured to turn on the third transistor when the difference between the AC input voltage and the DC output voltage exceeds a turn on threshold value, which is higher than the regulate threshold value.

8. The system of claim 7, wherein the transistor control circuit is further configured to turn off the third transistor when the difference between the AC input voltage and the DC output voltage falls below a turn off threshold value, which is lower than the regulate threshold value.

9. The system of claim 8, wherein the transistor control circuit is configured to produce a lock out signal for preventing the fourth transistor from turning on when the third transistor is on.

10. The system of claim 9, wherein the transistor control circuit is configured to produce the lock out signal when the difference between the AC input voltage and the DC output voltage exceeds a lock out threshold value.

11. The system of claim 10, wherein the lock out threshold value is lower than the regulate threshold value.

12. The system of claim 1, wherein the transistors are MOSFETs.

13. A system for converting an AC input voltage into a DC output voltage, comprising:
first and second transistors arranged in a first transistor pair,
third and fourth transistors arranged in a second transistor pair, and
a controller responsive to the AC input voltage and the DC output voltage to control switching of the first, second, third and fourth transistors,
the controller including a transistor control circuit for turning on the third transistor based on a difference between the AC input voltage and the DC output voltage, the transistor control circuit being configured for producing a first lock out signal asserted to prevent the fourth transistor from turning on when the third transistor is on.

14. The system of claim 13, wherein the transistor control circuit is configured for producing a second lock out signal asserted to prevent the third transistor from turning on when the fourth transistor is on.

15. The system of claim 13, wherein the transistor control circuit is configured for turning on the third transistor when a difference between the AC input voltage and the DC output voltage exceeds a turn on threshold value, and the transistor control circuit is further configured for producing the first lock out signal when the difference between the AC input voltage and the DC output voltage exceeds a lock out threshold value which is lower than the turn on threshold value.

16. The system of claim 13, wherein the controller further comprises an AC polarity detect circuit for producing first and second enabling signals based on the polarity of the AC input signal, the first and second enabling signals are generated to respectively turn on the first and second transistors.

17. The system of claim 16, wherein the AC polarity detect circuit is configured to produce the first enabling signal so as to prevent the second transistor from turning on when the first transistor is on.

18. The system of claim 17, wherein the AC polarity detect circuit is configured to produce the second enabling signal so as to prevent the first transistor from turning on when the second transistor is on.

19. A method of controlling a circuit for converting an AC input voltage into a DC output voltage that has first and second transistors arranged in a first transistor pair, and third and fourth transistors arranged in a second transistor pair; the method comprising the steps of:
controlling a transistor of the first pair in accordance with polarity of the AC input voltage, and
controlling a transistor of the second pair based on a difference between the AC input voltage and the DC output voltage.

20. The method of claim 19, wherein the transistor of the second pair is turned on when the difference between the AC input voltage and the DC output voltage exceeds a turn on threshold value, and the transistor of the second pair is turned off when the difference between the AC input voltage and the DC output voltage falls below a turn off threshold value, which is lower than the turn on threshold value.

21. The method of claim 19, further comprising the step of producing a lock out signal based on the difference between the AC input voltage and the DC output voltage to control transistors of the second pair so as to prevent the fourth transistor from turning on when the third transistor is on.

22. The method of claim 19, further comprising the step of producing an enabling signal based on the polarity of the AC input signal to control transistors of the first pair so as to prevent the second transistor from turning on when the first transistor is on.

23. A system for converting an AC input voltage into a DC output voltage, comprising:
first and second input nodes for providing the AC input voltage,
first and second transistors arranged in a first transistor pair,
third and fourth transistors arranged in a second transistor pair, and
a controller responsive to the input voltage and the output voltage to control switching of the first, second, third and fourth transistors,
the controller being configured for:
producing a first turn on signal for turning on the third transistor coupled to the first input node when a difference between a first voltage developed at the first input node and the output voltage exceeds a first turn on value,
producing a first regulate signal for controlling the third transistor to maintain the difference between the first voltage and the output voltage at a first regulate value lower than the first turn on value, and
producing a first turn off signal for turning off the third transistor when the difference between the first voltage and the output voltage falls below a first turn off value lower than the first regulate value.

24. The system of claim 23, wherein the controller is further configured for:
- producing a second turn on signal for turning on the fourth transistor coupled to the second input node when a difference between a second voltage developed at the second input node and the output voltage exceeds a second turn on value,
- producing a second regulate signal for controlling the fourth transistor to maintain the difference between the first voltage and the output voltage at a regulate value lower than the second turn on value, and
- producing a second turn off signal for turning off the fourth transistor when the difference between the second voltage and the output voltage falls below a second turn off value lower than the second regulate value.

25. The system of claim 24, wherein the first turn on value is substantially equal to the second turn on value, the first regulate value is substantially equal to the second regulate value and the first turn off value is substantially equal to the second turn off value.

* * * * *